(12) United States Patent
Marr et al.

(10) Patent No.: US 11,857,876 B2
(45) Date of Patent: Jan. 2, 2024

(54) SYSTEM AND METHOD FOR PROVIDING DYNAMICALLY VARIABLE MAPS IN A VIDEO GAME

(71) Applicant: Activision Publishing, Inc., Santa Monica, CA (US)

(72) Inventors: Michael D. Marr, Monroe, WA (US); Keith S. Kaplan, Bothell, WA (US); Nathan T. Lewis, Woodinville, WA (US)

(73) Assignee: Activision Publishing, Inc., Santa Monica, CA (US)

( * ) Notice: Subject to any disclaimer, the term of this patent is extended or adjusted under 35 U.S.C. 154(b) by 26 days.

(21) Appl. No.: 17/643,467

(22) Filed: Dec. 9, 2021

(65) Prior Publication Data
US 2022/0168637 A1    Jun. 2, 2022

Related U.S. Application Data

(62) Division of application No. 16/601,264, filed on Oct. 14, 2019, now Pat. No. 11,224,807, which is a (Continued)

(51) Int. Cl.
A63F 13/00 (2014.01)
A63F 13/52 (2014.01)
(Continued)

(52) U.S. Cl.
CPC .............. *A63F 13/52* (2014.09); *A63F 13/55* (2014.09); *A63F 13/60* (2014.09); *A63F 13/795* (2014.09)

(58) Field of Classification Search
CPC .......... A63F 13/52; A63F 13/55; A63F 13/60; A63F 13/795
See application file for complete search history.

(56) References Cited

U.S. PATENT DOCUMENTS 4,129,859 A   12/1978  Iwamura
4,442,495 A    4/1984  Sukonick
(Continued)

FOREIGN PATENT DOCUMENTS

AU            768367     3/2004
AU        2005215048    10/2011
(Continued)

OTHER PUBLICATIONS

Wikipedia: Minecraft, May 12, 2014, <https://en.wikipedia.org/w/index.php?title=Minecraft&oldid=608156811>.

Primary Examiner — Dmitry Suhol
Assistant Examiner — Jason Pinheiro
(74) Attorney, Agent, or Firm — Novel IP

(57) ABSTRACT

A system and method for providing dynamically variable maps in a video game is disclosed. A map is provided that defines a playable space available to one or more game players in a video game. Gameplay is monitored in real-time for the detection of a trigger event. Upon detection of a trigger event, a map management engine dynamically modifies a configuration of the map to improve the gameplay experience based on the type of trigger event. Dynamic modification of a map may comprise altering one or more of the map boundary, and/or the location, position, size, number, state, etc. of one or more static map objects or dynamic map objects. As a result of the dynamic modification of the map, the map may transform from its initial (or first or beginning) configuration to a modified (or new or second) configuration.

50 Claims, 6 Drawing Sheets

Related U.S. Application Data division of application No. 14/712,417, filed on May 14, 2015, now Pat. No. 10,486,068.

(51) Int. Cl.
*A63F 13/55* (2014.01)
*A63F 13/60* (2014.01)
*A63F 13/795* (2014.01)

(56) References Cited

U.S. PATENT DOCUMENTS

| | | |
|---|---|---|
| 4,533,910 A | 8/1985 | Sukonick |
| 4,642,790 A | 2/1987 | Minshull |
| 4,796,201 A | 1/1989 | Wake |
| 4,831,556 A | 5/1989 | Oono |
| 4,860,217 A | 8/1989 | Sasaki |
| 5,148,154 A | 9/1992 | Mackay |
| 5,303,388 A | 4/1994 | Kreitman |
| 5,392,388 A | 2/1995 | Gibson |
| 5,412,768 A | 5/1995 | Ozaki |
| 5,422,987 A | 6/1995 | Yamada |
| 5,446,833 A | 8/1995 | Miller |
| 5,454,371 A | 10/1995 | Fenster |
| 5,463,729 A | 10/1995 | Kitaguchi |
| 5,511,157 A | 4/1996 | Wang |
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,964,660 A | 10/1999 | James |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,497,776 B1 * | 3/2009 | Roman ............... A63F 13/5375 463/31 |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,559,834 B1 * | 7/2009 | York ..................... A63F 13/843 463/2 |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |

(56) References Cited

U.S. PATENT DOCUMENTS

| | | |
|---|---|---|
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,864,583 B1 * | 10/2014 | Lotzer ............... A63F 13/352 463/31 |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 10,709,981 B2 * | 7/2020 | Lang ............... A63F 13/67 |
| 2004/0255040 A1 | 12/2004 | Lopes |
| 2009/0113448 A1 | 4/2009 | Smith |
| 2009/0149261 A1 | 6/2009 | Chen |

(56) References Cited

U.S. PATENT DOCUMENTS

| | | | | |
|---|---|---|---|---|
| 2012/0124189 | A1* | 5/2012 | Haggar | H04L 47/822 709/223 |
| 2014/0038708 | A1 | 2/2014 | John | |
| 2014/0344725 | A1 | 11/2014 | Bates | |
| 2016/0191671 | A1 | 6/2016 | Dawson | |
| 2021/0170283 | A1* | 6/2021 | Brown | A63F 13/352 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner

SYSTEM AND METHOD FOR PROVIDING DYNAMICALLY VARIABLE MAPS IN A VIDEO GAME

CROSS REFERENCE

The present application is a division application of U.S. patent application Ser. No. 16/601,264, entitled "System and Method for Providing Dynamically Variable Maps in a Video Game" and filed on Oct. 14, 2019, which is a division application of U.S. patent application Ser. No. 14/712,417, of the same title, filed on May 14, 2015, and issued as U.S. Pat. No. 10,486,068 on Nov. 26, 2019, both of which are herein incorporated by reference in their entirety.

FIELD OF THE INVENTION

The invention relates generally to video games, and more particularly to a system and method for providing dynamically variable maps in a video game.

BACKGROUND OF THE INVENTION

In most video games, a map is provided that defines the playable space available to one or more game players. A map may also be referred to as, for example, an area, a stage, a world, a zone, a location, or another similar descriptor. While the particular nature of a map may depend on the type of video game, some non-limiting examples of maps may include a building layout (e.g., one or more floors), a city layout, a forest, a fort, a battlefield, a racetrack, etc. Numerous other examples exist.

In those instances where the same map(s) are played repeatedly in a video game without variety or the introduction of new maps, game players may grow tired of playing the video game after a short period of time.

A lack of maps, or a lack of variety in the maps provided, may result in additional drawbacks for multiplayer video games in which two or more players typically play in a match during a gameplay session in a cooperative or adversarial relationship. One disadvantage of having fewer maps in a multiplayer game (in addition to boredom), is that an appropriate-sized map may not be available for every possible number of players. For instance, a map of a larger scale that is designed (or optimal) for twenty total players in a gameplay session may be too large or challenging (and therefore unsatisfying) for two teams of two players each (four total players). Likewise, a smaller scale map that is designed (or optimal) for eight total players in a gameplay session may be too constrained for two teams of ten players (twenty total players). In either instance, the enjoyment of gameplay may be diminished, resulting in frustrated or discouraged players.

Another example of a drawback associated with a limited number or variety of maps in a multiplayer game is that veteran players may develop more familiarity with available map(s), and hence an unbalanced advantage, over newer players. As such, novice or lower-skilled players, for instance, may feel that they are continually at a disadvantage.

Currently, a "brute force" approach exists to providing game players with more map variety, which is to generate more maps. One disadvantage of this approach is the time and expense required for video game developers to create entirely new maps. Creating new maps may require, among other things, a formidable amount of development time that may negatively impact a developer's ability to provide additional content and/or new titles to consumers. In addition, the new maps must be delivered to the game players' systems, adding additional costs and resources.

Another approach to providing map variety is to limit the availability of certain maps to gamers to pre-announced times. For example, a map which might normally be disabled during peak multiplayer gameplay hours may be made available to players at a time when player counts might otherwise be low. This approach, however, also provides disadvantages. For instance, the map that is made available is still a separate map that requires time and expense to create. Further, having a given map available for a limited time period still requires players to play the other available maps in a frequent manner until the pre-announced times, which may result in a poor or unsatisfying player experience.

These and other drawbacks exist with current maps in video games.

SUMMARY OF THE INVENTION

The invention addressing these and other drawbacks relates to a system and method for providing dynamically variable maps in a video game.

A dynamically variable (or modifiable) map is a map that defines a playable space available to one or more game players in a video game, and that may be altered from an initial (or first) configuration to a modified (or second) configuration, and so on, during a gameplay session to thereby change the playable space available to the players. In the description that follows, for brevity, the term "map" may be used in lieu of "dynamically variable map."

According to an aspect of the invention, a map may comprise one or more map features (or attributes) including, for example, a map boundary (or perimeter), one or more static map objects, and one or more dynamic map objects.

A map boundary may define (in whole or in part) an area of playable space available to one or more game players during a gameplay session. As described herein, the map boundary may be scalable (e.g., may expand or contract) or be otherwise altered during a gameplay session to change the area of available playable space.

Static map objects comprise objects that are typically stationary and may include, without limitation, objects such as a building, a wall, furniture, a tree, a large boulder, a body of water, a mountain, etc. The type of static map objects that may be presented on a map may differ depending on the type of video game.

Dynamic map objects are objects that may be movable from one position to another, or from one state to another. For instance, a vehicle may comprise a dynamic map object, as may a door or drawbridge that is capable of being moved from an open position (or state) to a closed position (or state). Similar to static map objects, the type of dynamic map objects that may be presented on a map may differ depending on the type of video game. In some instances, a dynamic map object may be moved or manipulated to change the area of (or otherwise alter aspects of) the available playable space.

In certain implementations, some static map objects may be considered dynamic map objects if they are capable of being (or are) moved or manipulated during gameplay. For example, a large boulder may comprise a static map object. However, the large boulder may also be considered a dynamic map object if it is capable of being (or is) moved or manipulated by one or more characters or equipment during a gameplay session.

According to an aspect of the invention, various configurations of playable space of a single map may be obtained by dynamically modifying the map boundary, one or more static map objects, and/or one or more dynamic map objects during a gameplay session. More particularly, a map may transform from an initial (or first) configuration to a modified (or second) configuration, and so on, during a gameplay session by altering the map boundary, and/or the location, position, size, number, state, etc. of one or more of static map objects, and/or dynamic map objects based on trigger events that occur during gameplay.

Examples of trigger events may include, but are not limited to, a change in a number of players in the gameplay session (e.g., the number of players exceeds or falls below a predetermined threshold), a change in a number of game players playing a particular player role (e.g., a number of a certain type of player roles in a match exceeds or falls below a predetermined threshold), the pace or frequency of gameplay actions/events exceeding or falling below a predetermined threshold, the commencement of a competition or newly available mission that takes place in a map, an inference that one or more players are unhappy with the current configuration of a map or otherwise would prefer variety (e.g., by monitoring unexpected attrition/rage quitting, or through explicit in-game voting or other feedback), or a change in other gameplay information, among other examples.

Trigger events may be system-defined (e.g., defined by the game logic) or user-defined (e.g., through one or more user interfaces prior to the commencement of a gameplay session). It should be appreciated that trigger events may be different for different maps, different video games, and/or for different maps utilized in the same video game. In some implementations, a collection of defined trigger events may be accessed and selectively applied to individual maps. In other implementations, trigger events may be created or customized for particular maps.

According to an aspect of the invention, a matchmaking engine may identify one or more players that are waiting to be matched (grouped), such as players whose in-game avatars are waiting in a virtual game lobby to join a gameplay session. The gameplay session may comprise any type of gameplay session including, without limitation, a real gameplay session and/or a practice gameplay session (e.g., associated with a "practice" or "training" mode of a game).

In one implementation, a player may be added to a gameplay session immediately if there is an opening. In another implementation, one or more gameplay sessions may be dynamically combined to create a single gameplay session involving the aggregate of all players in each of the original gameplay sessions. A gameplay session may be dynamically split to create two or more gameplay sessions, where a matchmaking engine may determine which players from the original sessions are grouped and placed into the resulting two or more gameplay sessions.

In one implementation, the matchmaking engine may generate one or more matches by grouping two or more of the identified players. The number of players placed in each match (contest) may depend on a number of players waiting to be matched, a number of players needed for a game session (e.g., a number of players needed to form a team or start a match), a number of players that can be accommodated by a game session, and/or other information. Different matches may include different combinations of different players, which may include different numbers of players.

The matchmaking engine may use known or hereafter-developed matchmaking techniques to generate a match by grouping players in an effort to produce the most satisfying player experiences. Game profiles, player profiles, match variables, and other factors may be considered when generating matches.

For clarity, it should be appreciated that the process of "matching" players refers to the grouping of players, and that "matched" players comprise players that have been grouped together (either in a cooperative or adversarial relationship) for a gameplay session by, for example, the matchmaking engine. Further, a "match" may also refer to a contest that is the subject of a gameplay session.

According to an aspect of the invention, a map selection engine may select, generate, or otherwise obtain a map for a match of a gameplay session. In some implementations, the map selection engine may select and retrieve one or more maps from among a collection of pre-generated maps stored, for instance, in one or more databases. Alternatively, the map selection engine may generate one or more maps, or dynamically modify one or more existing maps, in real-time ("on the fly") for a gameplay session to change the playable space by altering one or more of the map's boundary, static map object(s), and/or dynamic map object(s).

In some implementations, a map (whether selected, generated, or modified) may have an initial (or first or beginning) configuration based on gameplay session information. Gameplay session information may describe various game characteristics of a gameplay session that may influence the quality of gameplay. For example, gameplay session information may include, without limitation, a number of players, a composition of teams (e.g., number and/or types of roles in each team), duration of gameplay (e.g., how long a given gameplay session is expected to last), types of matches (e.g., team death match, capture the flag, etc.), and/or other information related to a gameplay session. In another implementation, a map may be selected for a match randomly.

In other implementations, one or more players may select the map to be played in a match of the gameplay session. For instance, before the start of a match, one or more players may vote on the map to be used during the gameplay session.

According to an aspect of the invention, once one or more players have been matched, and a map has been selected, generated, and/or modified, a gameplay session may commence. Gameplay may be monitored in real-time for the detection of a trigger event (e.g., by a trigger detection engine, or other game logic).

According to an aspect of the invention, when a trigger event is detected during gameplay, a map may be dynamically modified (from its initial configuration) as described in detail below. In some implementations, depending on the type of trigger event, detection of the trigger event alone may be sufficient to dynamically modify the map. In other implementations, the gameplay event or action that produced (or resulted in) the triggering event must persist for a predetermined period of time (e.g., a modification waiting period) before the map is dynamically modified. This avoids changing the map frequently when near trigger thresholds, since players may find this confusing or disruptive depending on the game or map design.

In some instances, two or more trigger events may occur during gameplay (and be detected) at substantially the same time. For example, both a number of players and a number of player roles of a certain type may exceed a predetermined threshold at substantially the same time. In such an instance, either or both of the detected trigger events may result in a dynamic modification of the map. For example, in one implementation, the most significant trigger event, as defined by game logic or a user, may be used to dynamically modify a configuration of the map. Alternatively, each trigger event may be used to dynamically modify a configuration of the map. In some implementations, the occurrence of multiple trigger events may reduce the waiting period to dynamically modify the map. For example, if one or more additional trigger events occur during the modification waiting period, the modification waiting period may be truncated. In other implementations, if two or more significant trigger events are detected within a predetermined (e.g., short) period of time, the dynamic map modification may occur immediately without a modification waiting period. Other configurations may be implemented.

In one implementation, a map management engine may dynamically modify a configuration of the map to improve the gameplay experience based on the type of trigger event. Dynamic modification of a map may comprise any one or more of: altering the boundary (or perimeter) of the map by, for example, increasing or decreasing the boundary such that the boundary respectively defines a larger or smaller area of playable space, and/or opening up or closing (or otherwise altering) one or more portions of the boundary; altering the location, position, size, number, state, etc. of one or more static map objects on the map; altering the location, position, size, number, state, etc. of one or more dynamic map objects on the map; scaling the entire map by increasing or decreasing the size of the map and its constituent objects (including any static map objects, dynamic map objects, virtual characters or avatars depicting players, etc.) to increase or decrease the area of available space, respectively; adding or removing non-player characters (NPC) or other artificial intelligence (AI) controlled avatars to the gameplay experience; combining all or a portion of the map with all or a portion of one or more additional maps; and/or modifying the attributes of existing map objects or terrain such that player interaction is fundamentally impacted. As a result of the dynamic modification of the map, the map may transform from its initial (or first or beginning) configuration to a modified (or new or second) configuration.

The following are illustrative and non-limiting examples of the various ways in which a map may be dynamically modified in real-time during gameplay in response to certain trigger events. While the examples described herein may reference various game levels or modes, characters, roles, game items, etc. associated with a First-Person-Shooter (FPS) game, it should be appreciated that any such examples are for illustrative purposes only, and are not intended to be limiting. The system and method described in detail herein may be used in any genre of multiplayer video game, without limitation.

In one implementation, a map be dynamically modified in real-time, during gameplay, based on a trigger event associated with a change in a number of players in the gameplay session (e.g., the number of players exceeds or falls below a predetermined threshold).

As one example, if a number of players during a gameplay session falls below a predetermined number (e.g., a lower or first threshold), the map management engine may switch the state of one or more dynamic map objects (e.g., close a doorway, block a hallway, remove a bridge, etc.) of the map to selectively close off regions of the map, thereby decreasing the available playable space of the map. In this regard, the remaining players may be forced to play in a smaller area which may, depending on the nature of the game, increase encounters with other players to foster more exciting action and gameplay. In some implementations, when a region of a map is selectively closed off (or otherwise dynamically altered), player avatars may be transported out of the non-playable area to another area of the map (e.g., to a standard safe spawn site). Alternatively, player avatars may be spawned elsewhere after a death (or other game event), and the region of the map to be closed may be closed once no more player avatars are in the region.

Conversely, if a number of players during a gameplay session exceeds a predetermined number (e.g., a higher or second threshold number), the map management engine may switch the state of one or more dynamic map objects (e.g., open a doorway, unblock a hallway, add/open a bridge, etc.) of the map to selectively open up additional regions of the map, thereby increasing the available playable space of the map.

In one implementation, a map may be dynamically modified in real-time, during gameplay, based on a trigger event associated with a change in a number of game players playing a particular player role. Player roles may, of course, differ based on the particular video game.

As a non-limiting example, a player role in a First-Person-Shooter game may comprise that of a sniper. During a gameplay session, if a number of players in the sniper role decreases to a number equal to or below a first (or lower) pre-determined threshold number, the map management engine may, as a result of the triggering event, add or provide ladders to (newly added or existing) sniper perches to the map or improve long-distance sight lines by removing occluding objects in order to incentivize players to switch to a sniper role to provide more balanced gameplay. In another example, the map may shrink or remove various map-based sniper advantages based on the inference that current players favor close-quarters gameplay.

By contrast, if a number of players in the sniper role increases during a gameplay session to a number equal to or above a second (or higher) pre-determined threshold number, the map management engine may, as a result of the triggering event, remove ladders and/or remove sniper perches and/or add occluding objects which reduce sight lines from the map in order to deter players from selecting the sniper role.

The types of static and/or dynamic map objects that may be added to or removed from (or be otherwise altered on) a map may differ based on the type and nature of various player roles in various video games.

In one implementation, a map may be dynamically modified in real-time, during gameplay, based on a trigger event associated with the pace or frequency of certain gameplay actions or events.

Referring once again to the example of a First-Person-Shooter game, excitement during gameplay may, for example, be based on the frequency of the occurrence of a particular event such as a firefight. As such, during a gameplay session, if the frequency of firefights decreases to a value equal to or below a first (or lower) pre-determined threshold value, the map management engine may, as a result of the triggering event, alter the area of playable space on the map by altering one or more of the map's boundary, static map object(s), and/or dynamic map object(s) to provide more opportunities for firefights and increase the pace of play.

By contrast, if the frequency of firefights increases during a gameplay session to a value equal to or above a second (or upper) pre-determined threshold value, the map management engine may, as a result of the triggering event, alter the area of playable space on the map by altering one or more of the map's boundary, static map object(s), and/or dynamic map object(s) to reduce the number of firefights and slow down the pace of play.

The various types of game actions or events that may be used as a triggering event may, of course, differ based on the particular video game.

In addition to the foregoing examples, a map may be dynamically modified in real-time, during gameplay, based on a trigger event associated with changes in other gameplay state information including, without limitation, types of matches (e.g., team death match, capture the flag, etc.), elapsed time or remaining time in a gameplay session, and/or other information related to a gameplay session.

These and other objects, features, and characteristics of the system and/or method disclosed herein, as well as the methods of operation and functions of the related objects of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for providing dynamically variable maps in a video game.

Exemplary System Architecture

Figure 1A:
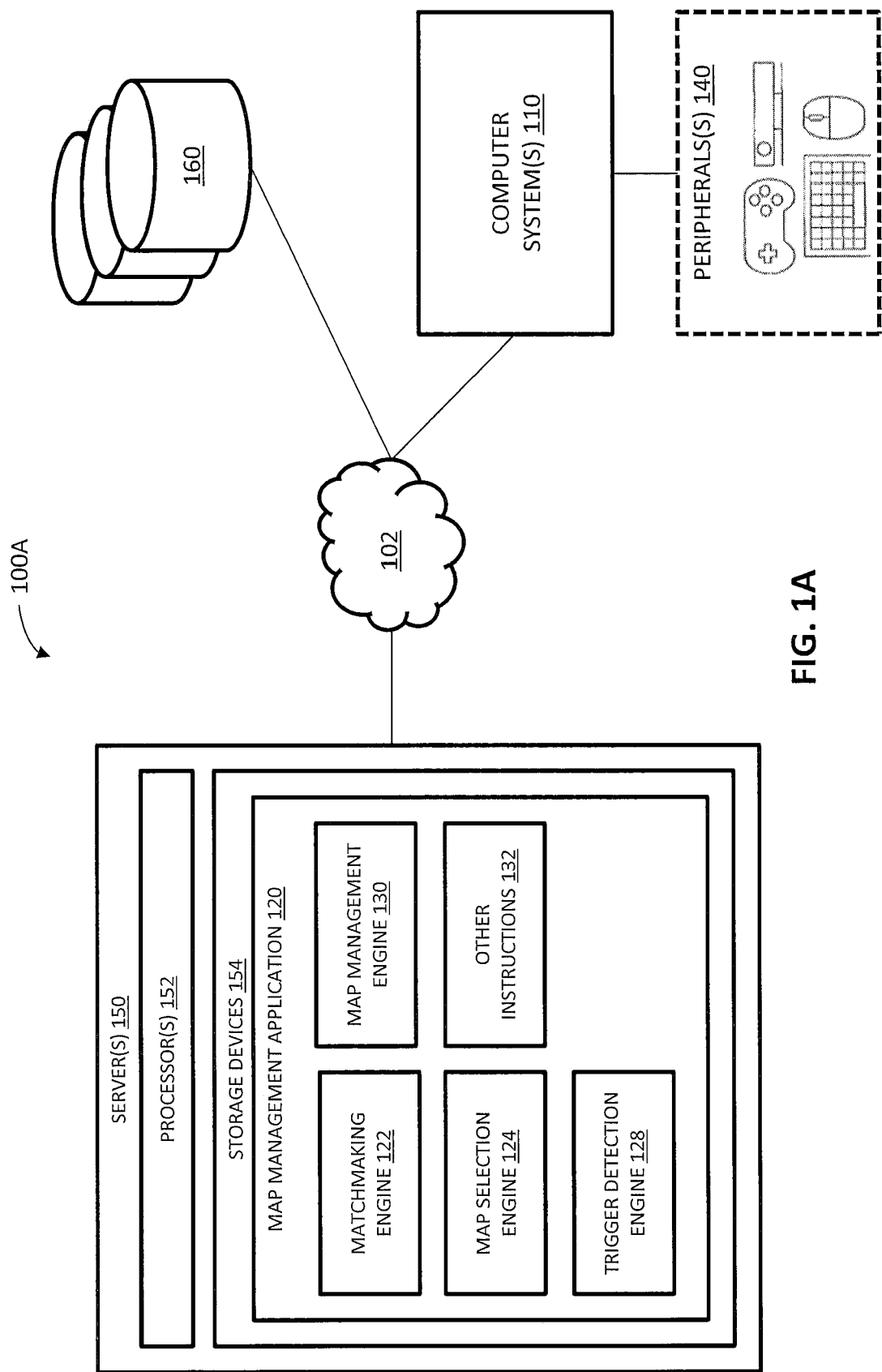
FIG. 1A illustrates an exemplary system for providing dynamically variable maps in a video game, according to an aspect of the invention.
Figure 1B:
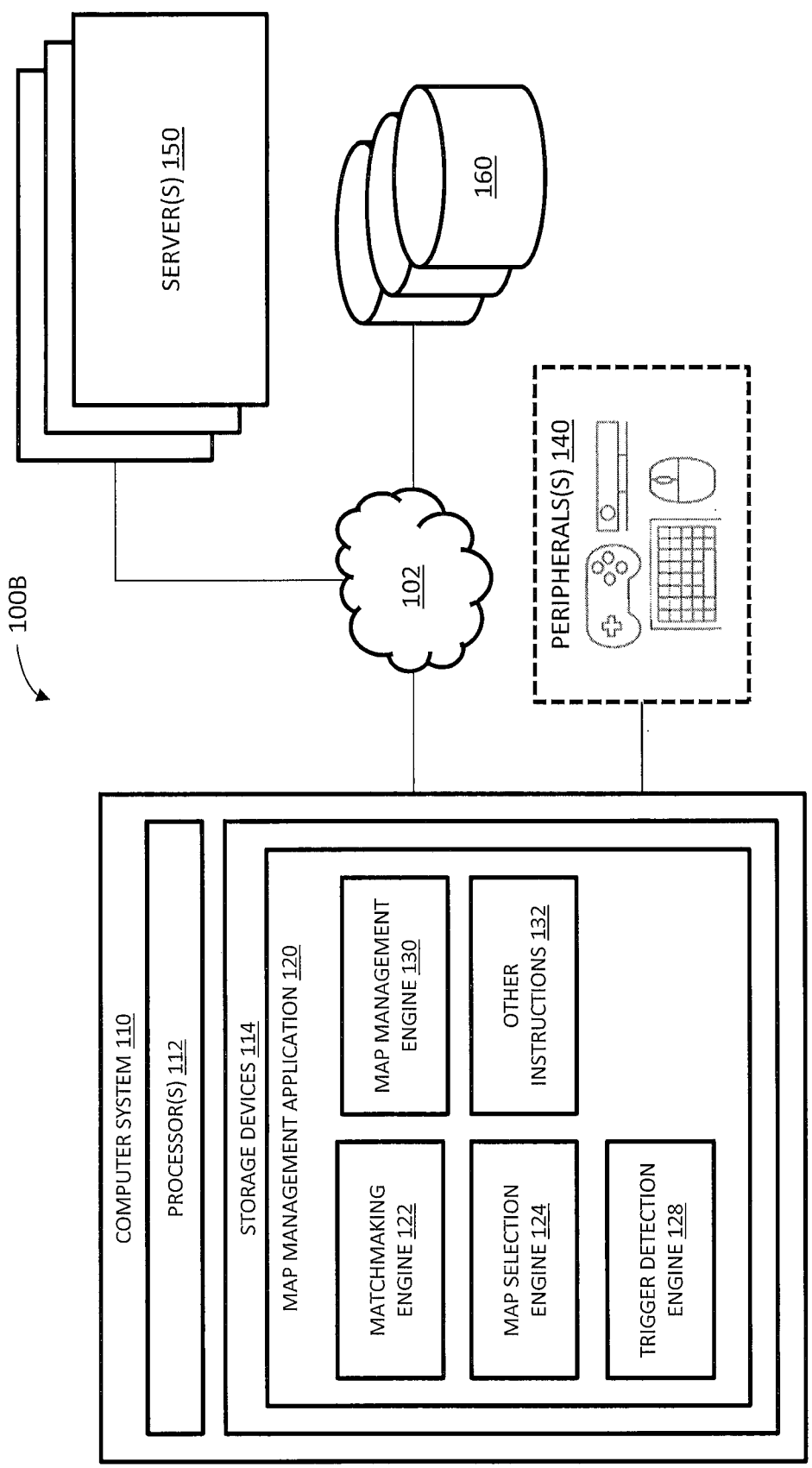
FIG. 1B illustrates an exemplary system for providing dynamically variable maps in a video game, according to an aspect of the invention.

FIGS. 1A and 1B each depict an exemplary architecture of a system 100 which may include one or more computer systems 110, one or more servers 150, one or more databases 160, and/or other components, according to one implementation of the invention.

FIG. 1A illustrates an implementation in which server(s) 150 function as a host computer that hosts gameplay between other devices, such as computer system(s) 110.

FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

Computer System 110

Computer system 110 may be configured as a gaming console, a handheld gaming device, a personal computer (e.g., a desktop computer, a laptop computer, etc.), a smartphone, a tablet computing device, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store a map management application 120), one or more peripherals 140, and/or other components. Processors 112 may be programmed by one or more computer program instructions. For example, processors 112 may be programmed by map management application 120 and/or other instructions (such as gaming instructions used to instantiate the game).

Depending on the system configuration, map management application 120 (or portions thereof) may be part of a game application, which creates a game instance to facilitate gameplay. Alternatively or additionally, map management application 120 may run on a device such as a server 150.

Map management application 120 may include instructions that program computer system 110. The instructions may include, without limitation, a matchmaking engine 122, a map selection engine 124, a trigger detection engine 128, a map management engine 130, and/or other instructions 132 that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 140 may be coupled to a corresponding computer system 110 via a wired and/or wireless connection.

Server 150

Server 150 may include one or more computing devices.

Referring to FIG. 1A, server 150 may include one or more physical processors 152 (also interchangeably referred to herein as processors 152, processor(s) 152, or processor 152 for convenience) programmed by computer program instructions, one or more storage devices 154 (which may store a map management application 120), and/or other components. Processors 152 may be programmed by one or more computer program instructions. For example, processors 152 may be programmed by gaming instructions used to instantiate the game.

Depending on the system configuration, map management application 120 (or portions thereof) may be part of a game application, which creates a game instance to facilitate gameplay. Alternatively or additionally, portions or all of map management application 120 may run on computer system 110 or server 150.

Map management application 120 may include instructions that program server 150. The instructions may include, without limitation, a matchmaking engine 122, a map selection engine 124, a trigger detection engine 128, a map management engine 130, and/or other instructions 132 that program server 150 to perform various operations, each of which are described in greater detail herein. As used herein, for convenience, the various instructions will be described as performing an operation, when, in fact, the various instructions program the processors 152 (and therefore server 150) to perform the operation.

Although each is illustrated in FIGS. 1A and 1B as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. Thus, either or both server 150 and computer system 100 may function as a host computer programmed by map management application 120. The one or more processors (112, 152) may each include one or more physical processors that are programmed by computer program instructions. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIG. 1 as being co-located within a single processing unit, in implementations in which processor(s) (112, 152) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112, 152) may be programmed by one or more additional instructions that may perform some or all of the functionality attributed herein to one of the instructions.

Storage Devices 114

The various instructions described herein may be stored in one or more storage devices, such as storage device (114, 154), which may comprise random access memory (RAM), read only memory (ROM), and/or other memory. The storage device may store the computer program instructions (e.g., the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

Network 102

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

In FIG. 1, as well as in other drawing Figures, different numbers of entities than those depicted may be used. Furthermore, according to various implementations, the components described herein may be implemented in hardware and/or software that configure hardware.

Databases 160

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The foregoing system architecture is exemplary only and should not be viewed as limiting. Other system configurations may be used as well, as would be appreciated by those having skill in the art.

Exemplary Multiplayer System Configurations

As noted above, a multiplayer video game is a video game in which two or more players play in a gameplay session in a cooperative or adversarial relationship. Multiplayer video games have exploded in popularity due, in part, to services such as Microsoft's Xbox LIVE® and Sony's PlayStation Network® which enable gamers all over the world to play with or against one another. Typically, when a player logs in to a game system or platform to play a multiplayer video game, the player may engage in a gameplay session in which he or she is matched with other players to play together (on the same team or as opponents).

Figure 2A:
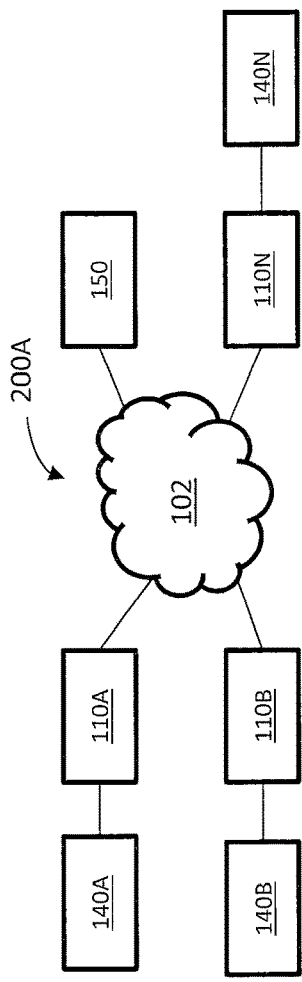
FIG. 2A illustrates an exemplary system configuration in which a server hosts a plurality of computer devices to facilitate a multiplayer game, according to an aspect of the invention.

FIG. 2A illustrates an exemplary system configuration 200A in which a server hosts a plurality of computer devices to facilitate a multiplayer game, according to an implementation of the invention. In one implementation, one or more servers 150 may host a number of computer systems 110 (illustrated as computer systems 110A, 110B, . . . , 110N) via network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of map management application 120 (illustrated in FIG. 1).

In some instances, a given server 150 may be associated with a proprietary gameplay network system, such as, without limitation, Microsoft's Xbox LIVE® and Sony's PlayStation Network®, and/or another type of gameplay network system. In this implementation, a given computer system 110 may be associated with a particular type of gaming console. Other types of computer systems 110 using other types of gameplay networks may be used as well.

Figure 2B:
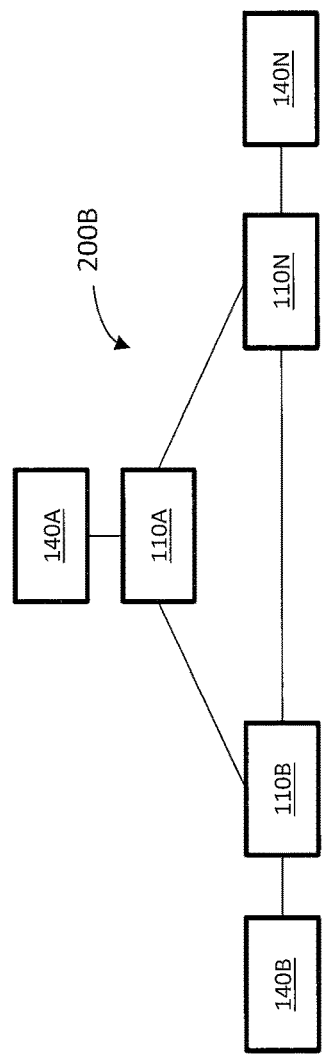
FIG. 2B illustrates an exemplary system configuration in which a plurality of networked servers communicate with one another to facilitate a multiplayer game, according to an aspect of the invention.

FIG. 2B illustrates an exemplary system configuration 200B in which a plurality of computer systems 110 are networked together to facilitate a multiplayer game, according to an implementation of the invention. Any one or more of the computer devices 110 may serve as a host and/or otherwise provide one or more operations of map management application 120 (illustrated in FIG. 1).

Figure 2C:
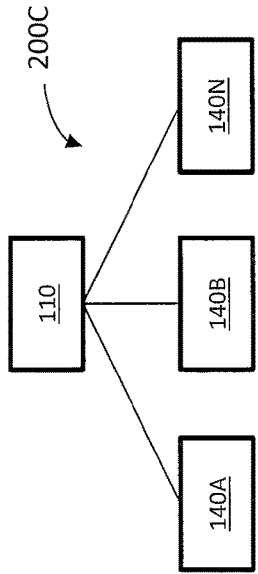
FIG. 2C illustrates an exemplary system configuration in which a plurality of computer devices are networked together to facilitate a multiplayer game, according to an aspect of the invention.

FIG. 2C illustrates an exemplary system configuration 200C in which a computer system 110 is used by a plurality of users to facilitate a multiplayer game, according to an implementation of the invention. In an implementation, computer system 110 may be considered to host the multiplayer game and/or otherwise provide one or more operations of map management application 120 (illustrated in FIG. 1).

Referring to FIGS. 2A-2C, in an implementation, a host may facilitate the multiplayer game and/or perform other operations described herein. In an implementation, at least some of these operations may also or instead be performed by an individual computer system 110. Furthermore, the illustrated system configurations are exemplary only and should not be viewed as limiting in any way. Other system configurations may be used as well, as would be appreciated by those having skill in the art.

While aspects of the invention may be described with reference to multiplayer video games, it should be recognized that the features and functionality described herein are equally applicable to a single player video game.

Generating Matches

According to an aspect of the invention, matchmaking engine 122 may identify one or more players that are waiting to be matched, such as players whose in-game avatars are waiting in a virtual game lobby to join a gameplay session. The gameplay session may comprise any type of gameplay session including, without limitation, a real gameplay session and/or a practice gameplay session (e.g., associated with a "practice" or "training" mode of a game).

In one implementation, a player may be added to a gameplay session immediately if there is an opening. In another implementation, one or more gameplay sessions may be dynamically combined to create a single gameplay session involving the aggregate of all players in each of the original gameplay sessions. A gameplay session may be dynamically split to create two or more gameplay sessions, where a matchmaking engine may determine which players from the original sessions are grouped and placed into the resulting two or more gameplay sessions.

In one implementation, matchmaking engine 122 may generate one or more matches by grouping two or more of the identified players. The number of players placed in each match may depend on a number of players waiting to be matched, a number of players needed for a game session (e.g., a number of players needed to form a team or start a match), a number of players that can be accommodated by a game session, and/or other information. Different matches may include different combinations of different players, which may include different numbers of players.

Matchmaking engine 122 may use known or hereafter-developed matchmaking techniques to generate a match (e.g., interchangeably referred to herein as "matchmaking") by grouping players in an effort to produce the most satisfying player experiences. Game profiles, player profiles, match variables, and other factors may be considered when generating matches.

Exemplary Map

Figure 3:
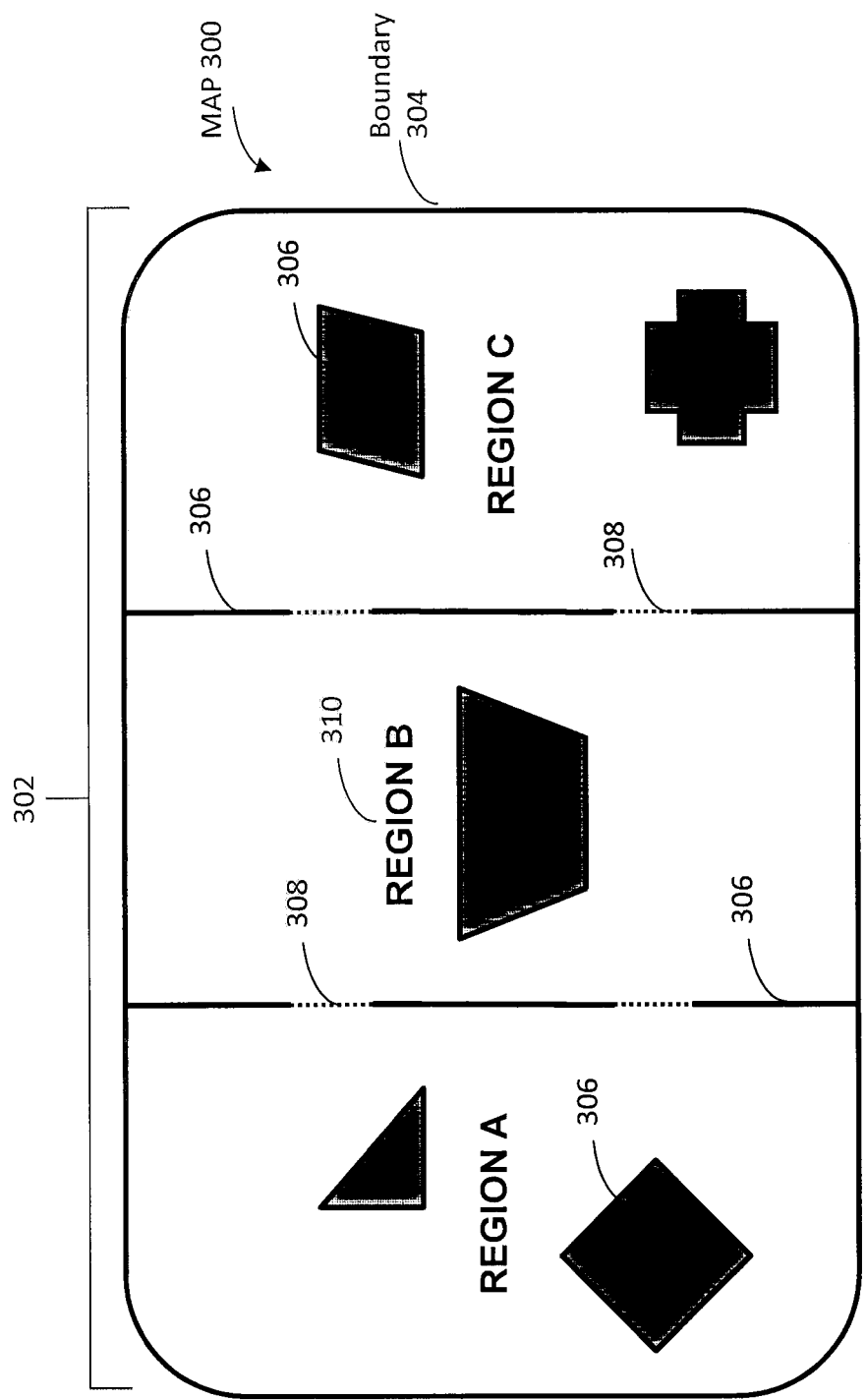
FIG. 3 depicts an exemplary illustration of a map that may be utilized in a gameplay session, according to an aspect of the invention.

According to one implementation of the invention, map selection engine 124 may select, generate, or otherwise obtain a map for a match of a gameplay session. FIG. 3 depicts an exemplary illustration of a map 300 that may be utilized in a gameplay session. Map 300 may comprise one or more map features (or attributes) including, for example, a map boundary (or perimeter) 304, one or more static map objects 306, and one or more dynamic map objects 308.

Map boundary 304 may define (in whole or in part) an area of playable space 302 available to one or more game players during a gameplay session. As described in greater detail below, map boundary 304 may be scalable (e.g., may expand or contract) or be otherwise altered during a gameplay session to change the area of playable space 302.

Examples of static map objects 306 may include, without limitation, objects that are typically stationary such as a building, a wall, furniture, a tree, a large boulder, a body of water, a mountain, etc. The type of static map objects 306 presented on map 300 may of course differ depending on the type of video game.

Dynamic map objects 308 are objects that may be movable from one position to another, or from one state to another. For instance, a vehicle (e.g., a race car, truck, spaceship, etc.) may comprise a dynamic map object 308. A door or drawbridge that is capable of being moved from an open position (or state) to a closed position (or state), or a river whose water level changes to make it passable or impassable, etc. may also comprise a dynamic map object 308. The type of dynamic map objects 308 presented on map 300 may differ depending on the type of video game. In some instances, a dynamic map object may be moved or manipulated to change the area of (or otherwise alter aspects of) playable space 302 (as described in greater detail below).

In certain implementations, some static map objects 306 may be considered dynamic map objects if they are capable of being (or are) moved or manipulated during gameplay. For example, a large boulder may comprise a static map object 306. However, the large boulder may also be considered a dynamic map object 308 if it is capable of being (or is) moved or manipulated by one or more characters or equipment during a gameplay session.

According to an aspect of the invention, one or more of boundary 304, static map object(s) 306, and/or dynamic map object(s) 308 may collectively comprise a configuration of playable space 302 available to players during a gameplay session. The configuration of available playable space 302 may therefore be altered during a gameplay session by changes to boundary 304, and/or the location, position, size, number, state, etc. of one or more of static map object(s) 306, and/or dynamic map object(s) 308.

As one non-limiting example, map 300 may comprise one or more regions 310 (e.g., region A, region B, region C, etc.). Map 300 may comprise a floor plan of a building, regions A-C may comprise separate rooms, dynamic map objects 308 may comprise doors, and static map objects 306 may comprise pieces of furniture. The total area of playable space 302 may comprise rooms A, B, and C if all of doors 308 are open, or are unlocked and capable of being opened. By contrast, doors 308 may be locked between rooms A and B, or rooms B and C. Accordingly, floor plan 300 may be dynamically configured or modified such that total area of playable space 302 comprises room A, room B, room C, rooms A and B, rooms B and C, or rooms A, B, and C. As yet another example, one or more pieces of furniture (or static map objects) 306 may be moved into a position to block an open door 308 such that the same effect is achieved as if door 308 were closed or locked.

As the foregoing clearly demonstrates, various configurations of playable space 302 may be achieved by dynamically modifying a single map 300.

In one implementation, as described in greater detail below, the configuration of the playable space 302 may be altered during a gameplay session by changes to boundary 304, and/or the location, position, size, number, state, etc. of one or more of static map object(s) 306, and/or dynamic map object(s) 308 based on trigger events that occur during gameplay.

Map Selection or Generation—Initial Configuration

As noted above, map selection engine 124 may select, generate, or otherwise obtain a map for a match of a gameplay session. For example, in some implementations, map selection engine 124 may select and retrieve one or more maps from among a collection of pre-generated maps stored, for instance, in database 160. Alternatively, map selection engine 124 may generate one or more maps, or dynamically modify one or more existing maps, in real-time ("on the fly") for a gameplay session to change the playable space by altering one or more of the map's boundary, static map object(s), and/or dynamic map object(s), as described above.

In some implementations, a map (whether selected, generated, or modified) may have an initial (or first or beginning) configuration based on gameplay session information. Gameplay session information may describe various game characteristics of a gameplay session that may influence the quality of gameplay. For example, gameplay session information may include, without limitation, a number of players, a composition of teams (e.g., number and/or types of roles in each team), duration of gameplay (e.g., how long a given gameplay session is expected to last), types of matches (e.g., team death match, capture the flag, etc.), and/or other information related to a gameplay session. In another implementation, a map may be selected for a match randomly.

In other implementations, one or more players may select the map to be played in a match of the gameplay session. For instance, before the start of a match, one or more players may vote on the map to be used during the gameplay session.

Trigger Events & Trigger Event Detection During Gameplay

According to an aspect of the invention, once a gameplay session has commenced, gameplay may be monitored in real-time for the detection of a trigger event (e.g., by trigger detection engine 128, or other game logic) that may cause the map to be dynamically modified (from its initial configuration) in order to improve the gameplay experience.

Examples of trigger events may include, but are not limited to, a change in a number of players in the gameplay session (e.g., the number of players exceeds or falls below a predetermined threshold), a change in a number of game players playing a particular player role (e.g., a number of a certain type of player roles in a match exceeds or falls below a predetermined threshold), the pace or frequency of gameplay actions/events exceeding or falling below a predetermined threshold, the commencement of a competition or newly available mission that takes place in a map, an inference that one or more players are unhappy with the current configuration of a map or otherwise would prefer variety (e.g., by monitoring unexpected attrition/rage quitting, or through explicit in-game voting or other feedback), or a change in other gameplay information, among other examples.

As a non-limiting example, matchmaking engine 122 may match one or more players into a map being used in a current gameplay session. The addition of the one or more players may comprise the trigger event that results in the dynamic modification of the map.

According to an aspect of the invention, trigger events may be system-defined (e.g., defined by the game logic) or user-defined (e.g., through one or more user interfaces prior to the commencement of a gameplay session). It should be appreciated that trigger events may be different for different maps, different video games, and/or for different maps utilized in the same video game. In some implementations, a collection of defined trigger events may be accessed and selectively applied to individual maps. In other implementations, trigger events may be created or customized for particular maps. Various configurations may be implemented.

According to an aspect of the invention, when a trigger event is detected during gameplay (e.g., by trigger detection engine 128, or other game logic), a map may be dynamically modified (from its initial configuration) as described in detail below. In some implementations, depending on the type of trigger event, detection of the trigger event alone may be sufficient to dynamically modify the map. In other implementations, the gameplay event or action that produced (or resulted in) the triggering event must persist for a predetermined period of time (e.g., a modification waiting period) before the map is dynamically modified. This avoids changing the map frequently when near trigger thresholds, since players may find this confusing or disruptive depending on the game or map design.

In some instances, two or more trigger events may occur during gameplay (and be detected) at substantially the same time. For example, both a number of players and a number of player roles of a certain type may exceed a predetermined threshold at substantially the same time. In such an instance, either or both of the detected trigger events may result in a dynamic modification of the map. For example, in one implementation, the most significant trigger event, as defined by game logic or a user, may be used to dynamically modify a configuration of the map. In some implementations, the occurrence of multiple trigger events may reduce the waiting period to dynamically modify the map. For example, if one or more additional trigger events occur during the modification waiting period, the modification waiting period may be truncated. In other implementations, if two or more significant trigger events are detected within a predetermined (e.g., short) period of time, the dynamic map modification may occur immediately without a modification waiting period. Other configurations may be implemented.

Dynamic Map Modification

According to an aspect of the invention, when trigger detection engine 128 detects a trigger event, map management engine 130 may dynamically modify a configuration of the map to improve the gameplay experience based on the type of trigger event.

Dynamic modification of a map may comprise any one or more of the following:

altering the boundary (or perimeter) of the map by, for example, increasing or decreasing the boundary such that the boundary respectively defines a larger or smaller area of playable space, and/or opening up or closing (or otherwise altering) one or more portions of the boundary;

altering the location, position, size, number, state, etc. of one or more static map objects on the map;

altering the location, position, size, number, state, etc. of one or more dynamic map objects on the map;

scaling the entire map by increasing or decreasing the size of the map and its constituent objects (including any static map objects, dynamic map objects, virtual characters or avatars depicting players, etc.) to increase or decrease the area of available space, respectively;

adding or removing non-player characters (NPCs) or other artificial intelligence (AI) controlled avatars to the gameplay experience;

combining all or a portion of the map with all or a portion of one or more additional maps; and/or modifying the attributes of existing map objects or terrain such that player interaction is fundamentally impacted. Examples may include making a river passable that was formerly impassable, or converting molten lava into cooling rock that can now be traversed without damaging a player's avatar. Regions of a map may also be modified (e.g., filled with water, lava, quick-sand, poisonous gas, poisonous swamps, etc.) to reduce or otherwise alter the playable space of the map without altering the boundary of the map.

As a result of the dynamic modification of the map, the map may transform from its initial (or first or beginning) configuration to a modified (or new or second) configuration. Further, each detected trigger event that occurs during a gameplay session may cause map management engine 130 to dynamically modify a most recent (e.g, second) configuration of the map to a further modified (or new or third) configuration.

The following are illustrative and non-limiting examples of the various ways in which a map may be dynamically modified in real-time during gameplay in response to certain trigger events.

Number of Players

In one implementation, a map be dynamically modified in real-time, during gameplay, based on a trigger event associated with a change in a number of players in the gameplay session (e.g., the number of players exceeds or falls below a predetermined threshold).

As one example, if a number of players during a gameplay session falls below a predetermined number (e.g., a lower or first threshold), map management engine 130 may switch the state of one or more dynamic map objects (e.g., close a doorway, block a hallway, remove a bridge, etc.) of the map to selectively close off regions of the map, thereby decreasing the available playable space of the map. In this regard, the remaining players may be forced to play in a smaller area which may, depending on the nature of the game, increase encounters with other players to foster more exciting action and gameplay. In some implementations, when a region of a map is selectively closed off (or otherwise dynamically altered), player avatars may be transported out of the non-playable area to another area of the map (e.g., to a standard safe spawn site). Alternatively, player avatars may be spawned elsewhere after a death (or other game event), and the region of the map to be closed may be closed once no more player avatars are in the region.

Conversely, if a number of players during a gameplay session exceeds a predetermined number (e.g., a higher or second threshold number), map management engine 130 may switch the state of one or more dynamic map objects (e.g., open a doorway, unblock a hallway, add/open a bridge, etc.) of the map to selectively open up additional regions of the map, thereby increasing the available playable space of the map.

Figure 4B:
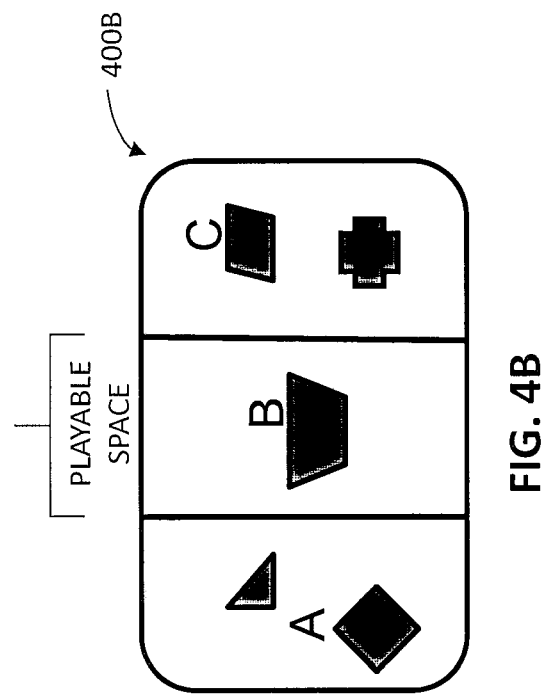
FIGS. 4A-4C illustrate exemplary configurations of a map that may be utilized in a gameplay session, according to an aspect of the invention.
Figure 4A:
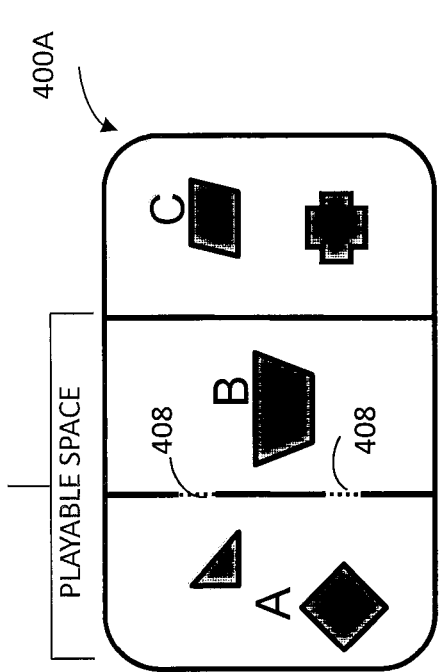
Figure 4C:
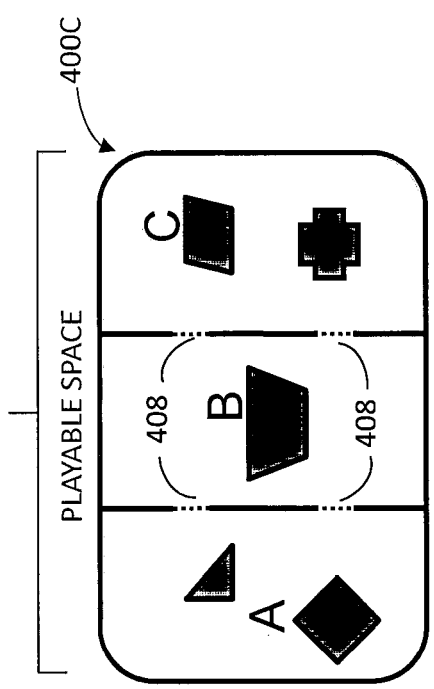

An example is illustrated in FIGS. 4A-4C. In particular, FIG. 4A depicts a map 400A in an initial configuration for a gameplay session of a multiplayer video game involving 16 players. As shown, map 400A includes, as playable space, regions A and B as dynamic map objects 408 are in an open state.

During gameplay, upon detection that the number of players in the gameplay session has decreased from 16 players to a number equal to or below a first (or lower) pre-determined threshold number (e.g., 8 players), map management engine 130 may, as a result of the triggering event, switch dynamic map objects 408 to a closed state (or remove them altogether), thereby reducing the available playable space of the map to comprise only Region B as shown in map 400B of FIG. 4B (in a second configuration of the map).

By contrast, during gameplay, upon detection that the number of players in the gameplay session has increased from 16 players to a number equal to or above a second (or upper) pre-determined threshold number (e.g., 20 players), map management engine 130 may, as a result of the triggering event, switch dynamic map objects 408 to an open state (and/or add new dynamic map objects), thereby increasing the available playable space of the map to comprise Regions A, B, and C as shown in map 400C of FIG. 4C (in a second configuration of the map).

In this regard, the map may by dynamically modified in real-time during a gameplay session such that various configurations of the map (such as those illustrated in FIGS. 4A, 4B, & 4C) may be made available to players based on trigger events that occur during gameplay.

In one implementation, the gameplay session (which players may join or leave in progress) may comprise an unbounded gameplay session such as that disclosed in co-pending, and concurrently filed, U.S. patent application Ser. No. 14/712,387, entitled "System and Method for Providing Continuous Gameplay in a Multiplayer Video Game Through an Unbounded Gameplay Session", which is hereby incorporated by reference herein in its entirety.

Types of Player Roles

In one implementation, a map may be dynamically modified in real-time, during gameplay, based on a trigger event associated with a change in a number of game players playing a particular player role. Player roles may, of course, differ based on the particular video game.

As a non-limiting example, a player role in a First-Person-Shooter game may comprise that of a sniper. During a gameplay session, if a number of players in the sniper role decreases to a number equal to or below a first (or lower) pre-determined threshold number, map management engine 130 may, as a result of the triggering event, add or provide ladders to (newly added or existing) sniper perches to the map or improve long-distance sight lines by removing occluding objects in order to incentivize players switch to a sniper role to provide more balanced gameplay. In another example, the map may shrink or remove various map-based sniper advantages based on an inference that current players favor close-quarters gameplay.

By contrast, if a number of players in the sniper role increases during a gameplay session to a number equal to or above a second (or higher) pre-determined threshold number, map management engine 130 may, as a result of the triggering event, remove ladders and/or remove sniper perches and/or add occluding objects which reduce sight lines from the map in order to deter players from selecting the sniper role.

The types of static and/or dynamic map objects that may be added to or removed from (or be otherwise altered on) a map may differ based on the type and nature of various player roles in various video games.

Pace or Frequency of Gameplay Actions/Events

In one implementation, a map may be dynamically modified in real-time, during gameplay, based on a trigger event associated with the pace or frequency of certain gameplay actions or events.

Returning back to the non-limiting example of a First-Person-Shooter game, excitement during gameplay may, for example, be based on the frequency of the occurrence of a particular event such as a firefight. As such, during a gameplay session, if the frequency of firefights decreases to a value equal to or below a first (or lower) pre-determined threshold value, map management engine 130 may, as a result of the triggering event, alter the area of playable space on the map by altering one or more of the map's boundary, static map object(s), and/or dynamic map object(s) to provide more opportunities for firefights and increase the pace of play.

By contrast, if the frequency of firefights increases during a gameplay session to a value equal to or above a second (or upper) pre-determined threshold value, map management engine 130 may, as a result of the triggering event, alter the area of playable space on the map by altering one or more of the map's boundary, static map object(s), and/or dynamic map object(s) to reduce the number of firefights and slow down the pace of play.

The various types of game actions or events that may be used as a triggering event may, of course, differ based on the particular video game.

Gameplay State Information

In addition to the foregoing examples, a map may be dynamically modified in real-time, during gameplay, based on a trigger event associated with changes in other gameplay state information including, without limitation, types of matches (e.g., team death match, capture the flag, etc.), elapsed time or remaining time in a gameplay session, and/or other information related to a gameplay session. For example, in some implementations, if the elapsed time of a gameplay session reaches a predetermined threshold, a map may be dynamically modified in any one or more of the manners described herein for variety. Numerous configurations may be implemented.

Exemplary Flowchart

Figure 5:
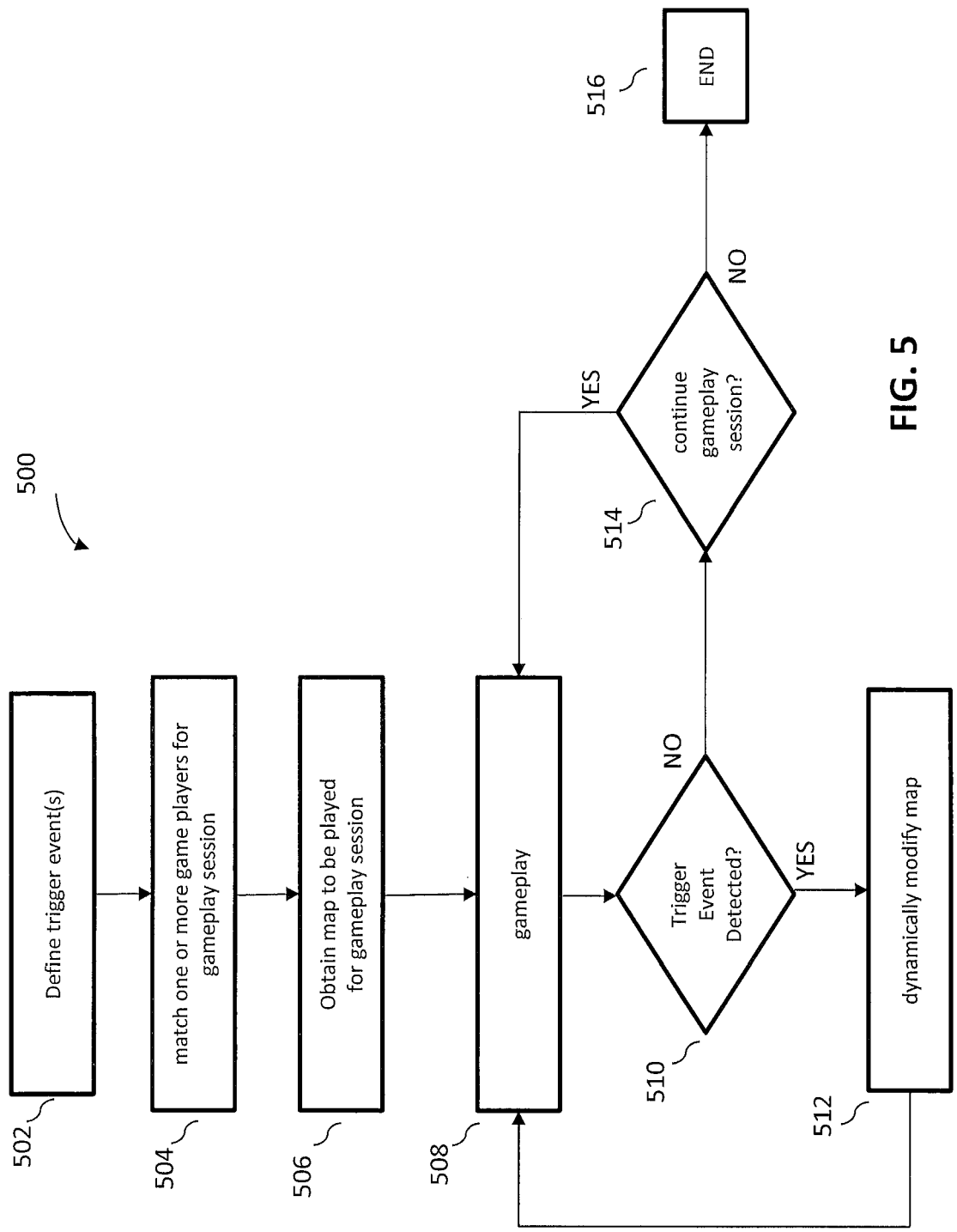
FIG. 5 depicts an exemplary flowchart of processing operations for providing dynamically variable maps in a video game, according to an aspect of the invention.

FIG. 5 depicts an exemplary flowchart 500 of processing operations for providing dynamically variable maps in a video game, according to an aspect of the invention. The various processing operations and/or data flows depicted in FIG. 5 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, one or more trigger events may be defined. Trigger events may be system-defined (e.g., defined by the game logic) or user-defined (e.g., through one or more user interfaces prior to the commencement of a gameplay session). It should be appreciated that trigger events may be different for different maps, different video games, and/or for different maps utilized in the same video game. Examples of trigger events may include, but are not limited to, a change in a number of players in the gameplay session (e.g., the number of players exceeds or falls below a predetermined threshold), a change in a number of game players playing a particular player role (e.g., a number of a certain type of player roles in a match exceeds or falls below a predetermined threshold), the pace or frequency of gameplay actions/events exceeding or falling below a predetermined threshold, the commencement of a competition or newly available mission that takes place in a map, an inference that one or more players are unhappy with the current configuration of a map or otherwise would prefer variety (e.g., by monitoring unexpected attrition/rage quitting, or through explicit in-game voting or other feedback), or a change in other gameplay information, among other examples.

In an operation 504, one or more players, such as players whose in-game avatars are waiting in a virtual game lobby to join a gameplay session, may be matched. In one implementation, a matching engine may use known or hereafter-developed matchmaking techniques to generate a match by grouping players in an effort to produce the most satisfying player experiences. Game profiles, player profiles, match variables, and other factors may be considered when generating matches.

In an operation 506, a map selection engine may select, generate, or otherwise obtain a map for a match of a gameplay session. In some implementations, one or more maps may be selected and retrieved from among a collection of pre-generated maps stored, for instance, in one or more databases. Alternatively, the map selection engine may generate one or more maps, or dynamically modify one or more existing maps, in real-time ("on the fly") for a gameplay session to change the playable space by altering one or more of the map's boundary, static map object(s), and/or dynamic map object(s).

In some implementations, a map (whether selected, generated, or modified) may have an initial (or first or beginning) configuration based on gameplay session information. Gameplay session information may describe various game characteristics of a gameplay session that may influence the quality of gameplay. For example, gameplay session information may include, without limitation, a number of players, a composition of teams (e.g., number and/or types of roles in each team), duration of gameplay (e.g., how long a given gameplay session is expected to last), types of matches (e.g., team death match, capture the flag, etc.), and/or other information related to a gameplay session. In another implementation, a map may be selected for a match randomly.

In yet other implementations, one or more players may select the map to be played in a match of the gameplay session. For instance, before the start of a match, one or more players may vote on the map to be used during the gameplay session.

In an operation 508, a gameplay session may commence. The gameplay session may comprise any type of gameplay session including, without limitation, a real gameplay session and/or a practice gameplay session (e.g., associated with a "practice" or "training" mode of a game).

In an operation 510, gameplay may be monitored in real-time for the detection of a trigger event (e.g., by a trigger detection engine, or other game logic).

If no trigger event is detected in operation 510, a determination may be made as to whether the gameplay session should continue. If so, processing may resume at operation 508. If not, the gameplay session may terminate in an operation 516.

If a trigger event is detected in operation 510, the map (provided in operation 506) may be dynamically modified (from its initial configuration) in an operation 512.

In operation 512, a map management engine may dynamically modify a configuration of the map to improve the gameplay experience based on the type of trigger event. Dynamic modification of a map may comprise any one or more of: altering the boundary (or perimeter) of the map by, for example, increasing or decreasing the boundary such that the boundary respectively defines a larger or smaller area of playable space, and/or opening up or closing (or otherwise altering) one or more portions of the boundary; altering the location, position, size, number, state, etc. of one or more static map objects on the map; altering the location, position, size, number, state, etc. of one or more dynamic map objects on the map; scaling the entire map by increasing or decreasing the size of the map and its constituent objects (including any static map objects, dynamic map objects, virtual characters or avatars depicting players, etc.) to increase or decrease the area of available space, respectively; adding or removing non-player characters (NPC) or other artificial intelligence (AI) controlled avatars to the gameplay experience; combining all or a portion of the map with all or a portion of one or more additional maps; and/or modifying the attributes of existing map objects or terrain such that player interaction is fundamentally impacted.

As a result of the dynamic modification of the map, the map may transform from its initial (or first or beginning) configuration to a modified (or new or second) configuration. Gameplay may then continue in operation 508.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of providing a dynamically variable map in a multiplayer video game, the method being implemented in a host computer system having one or more physical processors programmed with computer program instructions that, when executed by the one or more physical processors, cause the host computer system to perform the method, the method comprising:
    obtaining, by the host computer system, a map for use in a gameplay session, the map having a first configuration defining a first virtual area available to each of a plurality of players participating in the gameplay session;
    detecting, by the host computer system, an event in the gameplay session, wherein the event has a frequency of occurrence during the gameplay session;
    detecting, by the host computer system, an occurrence of a trigger event during the gameplay session, wherein the trigger event comprises the frequency of occurrence of the event exceeding or falling below a threshold value during the gameplay session; and
    dynamically modifying the map to a second configuration, by the host computer system, responsive to a detection of the trigger event, wherein the second configuration defines a second virtual area available to the plurality of players and wherein the second virtual area is different than the first virtual area; and
    terminating the gameplay session if no occurrence of the trigger event is detected.

2. The method of claim 1, wherein the event in the gameplay session comprises a change in a total number of players in the gameplay session.

3. The method of claim 1, wherein the gameplay session is monitored in real-time for the detection of occurrence of the trigger event.

4. The method of claim 1, wherein defining a second virtual area available to the plurality of players comprises one of altering a boundary of the map or closing one or more portions of the boundary of the map.

5. The method of claim 1, wherein dynamically modifying the map to a second configuration in response to a detection of the trigger event comprises switching one or more dynamic map objects to a closed state for reducing an available playable space of the map.

6. The method of claim 1, wherein defining the second virtual area available to the plurality of players comprises altering one of a location, a position, a size, a number, or a state of one or more static map objects on the map.

7. The method of claim 1, wherein defining the second virtual area available to the plurality of players comprises altering one of a location, a position, a size, a number, or a state of one or more dynamic map objects on the map to selectively close off one or more regions of the map.

8. The method of claim 1, wherein dynamically modifying the map to a second configuration comprises transporting avatars of one or more of the plurality of players from a first region of the first virtual area to second region of the second virtual area and wherein the first region is closed off for gameplay.

9. The method of claim 1, wherein dynamically modifying the map to a second configuration comprises reducing a playable space of the map by altering one or more of a boundary of the map, a static map object, or a dynamic map object.

10. A system for providing a dynamically variable map in a video game, the system comprising:
    a host computer system comprising one or more physical processors programmed with one or more computer program instructions which, when executed, programs the host computer system to:
        obtain a map for use in a gameplay session, the map having a first configuration defining a first virtual area available to each of a plurality of players;
        detect an event in the gameplay session, wherein the event has a frequency of occurrence during the gameplay session;
        detect an occurrence of a trigger event during the gameplay session, wherein the trigger event comprises the frequency of occurrence of the event exceeding or falling below a threshold value during the gameplay session
        dynamically modify the map to a second configuration responsive to a detection of the trigger event, wherein the second configuration defines a second virtual area available to the plurality of players and wherein the second virtual area is different than the first virtual area; and
        terminate the gameplay session if no occurrence of the trigger event is detected.

11. The system of claim 10, wherein the event in the gameplay session comprises one of a change in a number of players in the gameplay session, a change in a number of players playing a predefined player role, a change in a frequency of occurrence of predefined gameplay actions, commencement of a predefined gameplay competition, or an inference that one or more of the plurality of players are unhappy with the first configuration of the map.

12. The system of claim 10, wherein the trigger event is defined by one of the system or a player through one or more user interfaces of the video game prior to commencement of the gameplay session.

13. The system of claim 10, wherein the one or more computer program instructions, when executed, further program the host computer system to monitor in real time the gameplay session for the detection of occurrence of a trigger event.

14. The system of claim 10, wherein the one or more computer program instructions, when executed, further program the host computer system to dynamically modify the obtained map, in real-time to the second configuration to reduce a playable space of the map by altering one or more of a boundary of the map, a static map object, or a dynamic map object.

15. The system of claim 10, wherein the second virtual area available to the plurality of players is defined by one of altering a boundary of the map or closing one or more portions of the boundary of the map.

16. The system of claim 10, wherein the map is dynamically modified to a second configuration in response to a detection of the trigger event by switching one or more dynamic map objects to a closed state for reducing an available playable space of the map.

17. The system of claim 10, wherein the second virtual area available to the plurality of players is defined by altering one of a location, a position, a size, a number, or a state of one or more static map objects on the map.

18. The system of claim 10, wherein dynamically modifying the map to a second configuration comprises transporting avatars of one or more of the plurality of players from a first region of the first virtual area to second region of the second virtual area and wherein the first region is closed off for gameplay.

19. A computer-implemented method of providing a dynamically variable map in a multiplayer video game, the method being implemented in a host computer system having one or more physical processors programmed with computer program instructions that, when executed by the one or more physical processors, cause the host computer system to perform the method, the method comprising:
   obtaining, by the host computer system, a map for use in a gameplay session, the map having a first configuration defining a first virtual area available to each of a plurality of players participating in the gameplay session;
   detecting, by the host computer system, an event in the gameplay session, wherein the event has a frequency of occurrence during the gameplay session;
   detecting, by the host computer system, an occurrence of a trigger event during the gameplay session, wherein the trigger event comprises the frequency of occurrence of the event exceeding or falling below a threshold value during the gameplay session; and
   dynamically modifying the map to a second configuration, by the host computer system, responsive to a detection of the trigger event, by switching one or more dynamic map objects to a closed state for reducing an available playable space of the map, wherein the second configuration defines a second virtual area available to the plurality of players and wherein the second virtual area is different than the first virtual area.

20. The computer implemented method of claim 19, wherein the event in the gameplay session comprises a change in a total number of players in the gameplay session.

21. The computer implemented method of claim 19, wherein the gameplay session is monitored in real-time for the detection of occurrence of the trigger event.

22. The computer implemented method of claim 19, wherein defining a second virtual area available to the plurality of players comprises one of altering a boundary of the map or closing one or more portions of the boundary of the map.

23. The computer implemented method of claim 19, wherein defining the second virtual area available to the plurality of players comprises altering one of a location, a position, a size, a number, or a state of one or more static map objects on the map.

24. The computer implemented method of claim 19, wherein defining the second virtual area available to the plurality of players comprises altering one of a location, a position, a size, a number, or a state of one or more dynamic map objects on the map to selectively close off one or more regions of the map.

25. The computer implemented method of claim 19, wherein dynamically modifying the map to a second configuration comprises transporting avatars of one or more of the plurality of players from a first region of the first virtual area to second region of the second virtual area and wherein the first region is closed off for gameplay.

26. The computer implemented method of claim 19, wherein dynamically modifying the map to a second configuration comprises reducing a playable space of the map by altering one or more of a boundary of the map, a static map object, or a dynamic map object.

27. A system for providing a dynamically variable map in a video game, the system comprising:
   a host computer system comprising one or more physical processors programmed with one or more computer program instructions which, when executed, programs the host computer system to:
   obtain a map for use in a gameplay session, the map having a first configuration defining a first virtual area available to each of a plurality of players;
   detect an event in the gameplay session, wherein the event has a frequency of occurrence during the gameplay session;
   detect an occurrence of a trigger event during the gameplay session, wherein the trigger event comprises the frequency of occurrence of the event exceeding or falling below a threshold value during the gameplay session and
   dynamically modify the map in real-time to a second configuration responsive to a detection of the trigger event, wherein the second configuration defines a second virtual area being different than the first virtual area, available to the plurality of players and wherein the second virtual area is a reduced playable space of the map obtained by altering one or more of a boundary of the map, a static map object, or a dynamic map object.

28. The system of claim 27, wherein the event in the gameplay session comprises one of a change in a number of players in the gameplay session, a change in a number of players playing a predefined player role, a change in a frequency of occurrence of predefined gameplay actions, commencement of a predefined gameplay competition, or an inference that one or more of the plurality of players are unhappy with the first configuration of the map.

29. The system of claim 27, wherein the trigger event is defined by one of the system or a player through one or more user interfaces of the video game prior to commencement of the gameplay session.

30. The system of claim 27, wherein the one or more computer program instructions, when executed, further program the host computer system to monitor in real time the gameplay session for the detection of occurrence of a trigger event.

31. The system of claim 27, wherein the second virtual area available to the plurality of players is defined by one of altering a boundary of the map or closing one or more portions of the boundary of the map.

32. The system of claim 27, wherein the map is dynamically modified to a second configuration in response to a detection of the trigger event by switching one or more dynamic map objects to a closed state for reducing an available playable space of the map.

33. The system of claim 27, wherein the second virtual area available to the plurality of players is defined by altering one of a location, a position, a size, a number, or a state of one or more static map objects on the map.

34. The system of claim 27, wherein dynamically modifying the map to a second configuration comprises transporting avatars of one or more of the plurality of players from a first region of the first virtual area to second region of the second virtual area and wherein the first region is closed off for gameplay.

35. A computer-implemented method of providing a dynamically variable map in a multiplayer video game, the method being implemented in a host computer system having one or more physical processors programmed with computer program instructions that, when executed by the one or more physical processors, cause the host computer system to perform the method, the method comprising:
   obtaining, by the host computer system, a map for use in a gameplay session, the map having a first configuration defining a first virtual area available to each of a plurality of players participating in the gameplay session;
   detecting, by the host computer system, an event in the gameplay session, wherein the event has a frequency of occurrence during the gameplay session;
   detecting, by the host computer system, an occurrence of a trigger event during the gameplay session, wherein the trigger event comprises the frequency of occurrence of the event exceeding or falling below a threshold value during the gameplay session; and
   dynamically modifying the map to a second configuration, by the host computer system, responsive to a detection of the trigger event, wherein the second configuration defines a second virtual area being different than the first virtual area, available to the plurality of players and wherein the second virtual area is a reduced playable space of the map obtained by altering one or more of a boundary of the map, a static map object, or a dynamic map object.

36. The computer implemented method of claim 35, wherein the event in the gameplay session comprises a change in a total number of players in the gameplay session.

37. The computer implemented method of claim 35, wherein the gameplay session is monitored in real-time for the detection of occurrence of the trigger event.

38. The computer implemented method of claim 35, wherein defining a second virtual area available to the plurality of players comprises one of altering a boundary of the map or closing one or more portions of the boundary of the map.

39. The computer implemented method of claim 35, wherein dynamically modifying the map to a second configuration in response to a detection of the trigger event comprises switching one or more dynamic map objects to a closed state for reducing an available playable space of the map.

40. The computer implemented method of claim 35, wherein defining the second virtual area available to the plurality of players comprises altering one of a location, a position, a size, a number, or a state of one or more static map objects on the map.

41. The computer implemented method of claim 35, wherein defining the second virtual area available to the plurality of players comprises altering one of a location, a position, a size, a number, or a state of one or more dynamic map objects on the map to selectively close off one or more regions of the map.

42. The computer implemented method of claim 35, wherein dynamically modifying the map to a second configuration comprises transporting avatars of one or more of the plurality of players from a first region of the first virtual area to second region of the second virtual area and wherein the first region is closed off for gameplay.

43. A system for providing a dynamically variable map in a video game, the system comprising:
   a host computer system comprising one or more physical processors programmed with one or more computer program instructions which, when executed, causes the host computer system to:
   obtain a map for use in a gameplay session, the map having a first configuration defining a first virtual area available to each of a plurality of players participating in the gameplay session;
   detect an event in the gameplay session, wherein the event has a frequency of occurrence during the gameplay session;
   detect an occurrence of a trigger event during the gameplay session, wherein the trigger event comprises the frequency of occurrence of the event exceeding or falling below a threshold value during the gameplay session; and
   dynamically modify the map to a second configuration responsive to a detection of the trigger event, by switching one or more dynamic map objects to a closed state for reducing an available playable space of the map, wherein the second configuration defines a second virtual area available to the plurality of players and wherein the second virtual area is different than the first virtual area.

44. The system of claim 43, wherein the event in the gameplay session comprises a change in a total number of players in the gameplay session.

45. The system of claim 43, wherein the gameplay session is monitored in real-time for the detection of occurrence of the trigger event.

46. The system of claim 43, wherein defining a second virtual area available to the plurality of players comprises one of altering a boundary of the map or closing one or more portions of the boundary of the map.

47. The system of claim 43, wherein defining the second virtual area available to the plurality of players comprises altering one of a location, a position, a size, a number, or a state of one or more static map objects on the map.

48. The system of claim 43, wherein defining the second virtual area available to the plurality of players comprises altering one of a location, a position, a size, a number, or a state of one or more dynamic map objects on the map to selectively close off one or more regions of the map.

49. The system of claim 43, wherein dynamically modifying the map to a second configuration comprises transporting avatars of one or more of the plurality of players from a first region of the first virtual area to second region of the second virtual area and wherein the first region is closed off for gameplay.

50. The system of claim 43, wherein dynamically modifying the map to a second configuration comprises reducing a playable space of the map by altering one or more of a boundary of the map, a static map object, or a dynamic map object.

\* \* \* \* \*